(12) United States Patent
Mongardien

(10) Patent No.: US 7,411,727 B2
(45) Date of Patent: Aug. 12, 2008

(54) METHOD AND AN OPTICAL AMPLIFIER ASSEMBLY FOR ADJUSTING RAMAN GAIN

(75) Inventor: Dominique Annie Mongardien, Antony (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/583,018

(22) Filed: Oct. 19, 2006

(65) Prior Publication Data

US 2007/0115537 A1 May 24, 2007

(30) Foreign Application Priority Data

Nov. 21, 2005 (EP) .................................. 05292482

(51) Int. Cl.
*H01S 3/00* (2006.01)
(52) U.S. Cl. .................. 359/334; 359/337.1; 359/341.1
(58) Field of Classification Search .................. 359/334, 359/337.1, 337, 341.1
See application file for complete search history.

(56) References Cited

U.S. PATENT DOCUMENTS

| | | | |
|---|---|---|---|
| 6,366,393 B1 | 4/2002 | Feulner et al. | |
| 6,441,950 B1 | 8/2002 | Chen et al. | |
| 6,975,449 B1* | 12/2005 | Mok et al. | 359/341.41 |
| 7,075,710 B2* | 7/2006 | Inoue | 359/334 |
| 2002/0186456 A1* | 12/2002 | Inoue et al. | 359/334 |
| 2003/0151799 A1* | 8/2003 | Wight et al. | 359/334 |

FOREIGN PATENT DOCUMENTS

EP 1 130 819 A 9/2001

* cited by examiner

*Primary Examiner*—Mark Hellner
(74) *Attorney, Agent, or Firm*—Sughrue Mion, PLLC

(57) ABSTRACT

A method of adjusting Raman gain in an optical amplifier assembly (1a). The method comprises inputting a plurality (N) of optical signals (OS) on different wavelength channels to a backward-pumped Raman active medium (4a) pumped by means of a Raman pump source (5). The proposed method is characterized in that a slope with respect to time in a quantity representative of a respective amplified optical signal (OS') on at least one existing/surviving channel is determined in case of channel add/drop, and in that the Raman pump source (5) is tuned depending on said change. In this way, fast and reliable Raman pump tuning can be achieved even in an optical amplifier assembly (1a) and an optical transmission system, respectively, which suffer from channel adds/drops.

13 Claims, 3 Drawing Sheets

METHOD AND AN OPTICAL AMPLIFIER ASSEMBLY FOR ADJUSTING RAMAN GAIN

The invention is based on a priority application EP 05 292 482.6 which is hereby incorporated by reference.

TECHNICAL FIELD

The present invention relates to a method of adjusting Raman gain in an optical amplifier assembly, wherein a plurality of optical signals are input on different wavelength channels to a backward-pumped Raman active medium pumped by means of a Raman pump source.

The present invention also relates to an optical amplifier assembly, comprising a Raman active medium adapted to propagate a plurality of wavelength multiplexed optical signals to be amplified on a plurality of channels, and a Raman pump source adapted to deliver a number of counter-propagating pump signals to the Raman active medium.

Furthermore, the present invention relates to a wavelength division multiplexing (WDM) optical transmission system, comprising a transmitter adapted to transmit optical signals, a receiver adapted to receive the optical signals, and an optical transmission link connecting the transmitter and the receiver and adapted to propagate the optical signals.

BACKGROUND OF THE INVENTION

In optical transmission schemes and systems of the above-mentioned types Raman fibre amplifiers are generally used to amplify the propagated optical signals. The Raman amplifiers are generally designed to operate at a substantially flat spectral gain referred to as "nominal gain". Particularly in cases which lead to a change in the number of wavelength channels operable in the optical transmission system, so-called "channel adds" or "channel drops", e.g. due to fibre break or the like, a change in gain may be encountered.

Due to various interactions between different wavelength channels, in particular in dense wavelength division multiplexing (DWDM) systems such a change in channel number will generally lead to a transfer of optical power between different wavelength channels. However, in order to keep an appropriate bit error ratio (BER) for the surviving channels, their respective Raman gain must be maintained at essentially said nominal value. To this end, the pump powers of individual pump light sources comprised in the Raman pump source are tuned, i.e. adjusted in such a way as to produce roughly nominal valued Raman gain on surviving channels, i.e. a channel operable before and after a channel add/drop.

In prior art document EP 1 130 819 A1, a method for determining a wavelength-dependent gain figure of an optical amplifier is described, including a measurement of the total amplifier gain through measuring total input and output power of the amplifier. A gain tilt of the determined gain figure is compensated for by application of a gain tilt of opposite sign and magnitude in order to generate a flat gain figure over the amplified wavelength band.

This prior art approach suffers from the disadvantage, that in actual optical transmission systems of the above-mentioned type an optical output power on an existing/surviving channel may change abruptly during short periods of time depending on a position of said channels in the optical bandwidth of the transmission system before finally changing in the other direction due to a complex and temporarily diversified combination of signal-signal interactions (SSI) and signal-pump interactions (SPI). Thus, when dealing with channel adds/drops the above-described prior art approach may actually lead to an inadequate Raman gain control which will in turn deteriorate overall system performance.

SUMMARY OF THE INVENTION

It is the object of the invention to provide a method of adjusting Raman gain in an optical amplifier assembly of the above-mentioned type, which can be used to control Raman gain even in the presence of channel adds/drops.

It is also an object of the present invention to provide an optical amplifier assembly of the above-mentioned type, which does not suffer from the above-mentioned disadvantages in case of channel adds/drops.

It is also an object of the present invention to provide an optical transmission system of the above-mentioned type which presents nominal gain on surviving wavelength channels in the presence of channel adds/drops.

According to a first aspect of the present invention the object is achieved by providing a method of the above-mentioned type, wherein a slope with respect to time in a quantity representative of a respective optical signal on at least one surviving channel is determined in case of channel add/drop, and in that the Raman pump source is tuned depending of said slope.

According to a second aspect of the present invention in an optical amplifier assembly of the above-mentioned type the object is achieved by providing a detector circuit arranged on the Raman active medium and adapted to determine a slope with respect to time in a quantity representative of a respective amplified optical signal on an existing/surviving channel in case of channel add/drop, wherein the Raman pump source is tuneable in accordance with said slope for to achieve an essentially constant optical power on said existing/surviving channel.

According to a third aspect of the present invention, in a wavelength division multiplexing optical transmission system of the above-mentioned type the object is achieved by providing an optical amplifier assembly in accordance with said second aspect of the present invention comprised in the transmission link between the transmitter and the receiver.

As a general idea of the present invention, instead of tuning the respective pump powers of individual pump light sources comprised in the Raman pump source in accordance with an absolute (or relative) output power value of the signal channels, a temporal change (slope) in a quantity representative of a respective optical signal on an existing/surviving channel is used for to provide a control signal for tuning a Raman gain. In this way, embodiments in accordance with the present invention will not suffer from the above-mentioned disadvantages of the prior art as they will not respond to abrupt changes of the channel optical power on small time-scales.

In a further embodiment of the method in accordance with the present invention, a number of pump signals of the Raman pump source are adjusted to enhance an optical power on the existing/surviving channel, if said slope corresponds to a decrease in optical pump power on said channel with respect to time. Alternatively, said pump signals can be adjusted to reduce an optical power on the existing/surviving channel, if said slope corresponds to an increase in optical pump power on said channel with respect to time. As will become apparent later, due to the complex nature of signal-signal and signal-pump interactions in optical transmission systems suffering from adds/drops, the method in accordance with the present invention will effectively be able to distinguish abrupt changes from asymptotic transients which may require a particular system response with respect to the necessary adjustments of the Raman pump sources' pump signals regardless of the nature of a preceding abrupt change.

In corresponding embodiments of the optical amplifier assembly in accordance with the present invention the Raman pump source is tuneable to enhance a Raman gain for the existing/surviving channel, if said slope is negative, and a Raman pump source is tuneable to reduce a Raman gain for the existing/surviving channel, if said slope is positive.

In order to further distinguish between abrupt and asymptotic changes, in accordance with a preferred further embodiment of the method in accordance with the present invention the slope is determined over a predetermined asymptotic transient time, said time being preferably of the order of microseconds (μs). In a corresponding embodiment of the optical amplifier assembly in accordance with the present invention the detector circuit is adapted to determine said slope over a predetermined asymptotic transient time, in particular of the order of microseconds.

Advantageously, in another embodiment of the method in accordance with the present invention determining said slope involves determining a first derivative of said quantity with respect to time, which is a straightforward and easily implemented way of determining said slope with respect to time. In a corresponding further embodiment of the optical amplifier assembly in accordance with the present invention the detector circuit is adapted to determine said slope by means of determining a first derivative of said quantity with respect to time.

Another preferred embodiment of the method in accordance with the present invention said quantity is an optical power on the existing/surviving channel, the optical power being a quantity which is particularly easy to measure, e.g. by means of standard photo-detectors or the like.

In a corresponding further embodiment of the optical amplifier assembly in accordance with a said second aspect of the present invention the detector circuit is adapted to determine a slope in optical power on the existing/surviving channel.

Further characteristics and advantages of the present invention will become apparent from the following description of preferred embodiments that are given by way of example only with reference to the accompanying drawings. Individual features described above as well as below can be used either individually or in conjunction in accordance with the present invention.

DETAILED DESCRIPTION OF PREFERRED EMBODIMENTS

Figure 1:
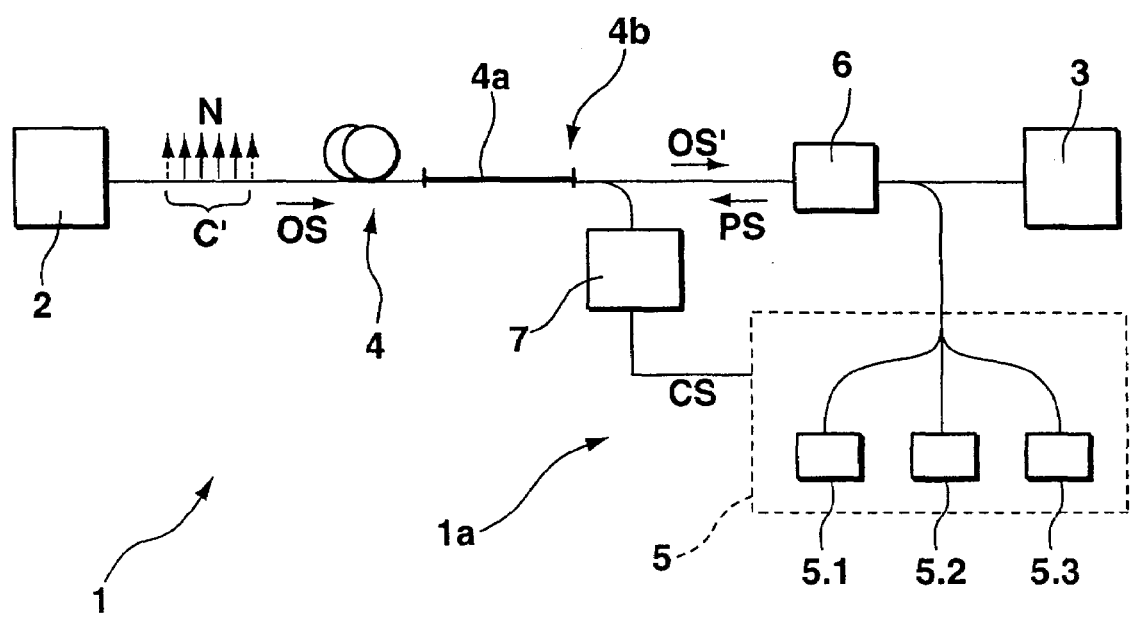
FIG. 1 is a schematic block diagram of an optical transmission system according to an aspect of the present invention comprising an optical amplifier assembly in accordance with another aspect of the present invention.

FIG. 1 shows a schematic block diagram of a wavelength division multiplexing (WDM) optical transmission system 1 in accordance with the present invention. The WDM optical transmission system 1 comprises a transmitter 2 and a receiver 3. The transmitter 2 is adapted to transmit optical signals OS, OS' to the receiver 3. To this end, the transmitter 2 and the receiver 3 are connected by means of an optical transmission link 4, e.g. in the form of an optical fibre, at least a section 4a of which is devised as a Raman active medium for imparting Raman amplification (Raman gain) on the optical signals OS. In the embodiment shown, the optical signals OS from the transmitter 2 are propagated on the optical transmission link 4, 4a on a plurality of N input signal channels, which are depicted as vertical arrows in FIG. 1. For instance, said input signal channels could be arranged in the extended C-band C', i.e. at wavelengths between 1530 nm and 1570 nm.

In the embodiment of FIG. 1 the WDM optical transmission system 1 further comprises a Raman pump source 5 incorporating a plurality of individual pump light sources 5.1, 5.2, 5.3, which are respectively coupled to a multiplexing means 6 provided on the optical transmission link 4, 4a for to inject a combined pump power of the individual pump light sources 5.1-5.3 at different respective wavelengths as a combined pump signal PS into the Raman active medium 4a. In this way, the Raman active medium 4a effectively functions as a backward-pumped fibre Raman amplifier (FRA), as known to a person skilled in the art. In the illustration of FIG. 1 the original optical signals are denoted OS, whereas the optical signals amplified by the Raman amplifier are denoted OS'.

Furthermore, in operative connection with an output 4b of the Raman active transmission link section 4a the optical transmission system 1 of FIG. 1 comprises a detector circuit 7, which is adapted to determine a slope with respect to time in a quantity representative of at least one amplified optical signal OS' on the optical transmission link 4, 4a, as will become apparent later. The detector circuit 7 is coupled to the optical transmission link 4, 4a by means of a tap coupler (not explicitly shown) as well as to the Raman pump source 5.

In the optical transmission system 1 in accordance with an embodiment of the present invention the detector circuit 7 is operable to deliver a control signal CS to the Raman pump source 5 for to control a tuning thereof with respect to the Raman gain imparted on the amplified optical signals OS' propagated on the optical transmission link 4, 4a in case of add/drop of input signal channels, as depicted in an exemplary fashion by means of the dashed vertical arrows.

As known to a person skilled in the art, in WDM optical transmission systems, particular Dense Wavelength Division Multiplexing (DWDM) systems, stimulated Raman scattering (SRS) as used in fibre Raman amplifiers affects the optical signals in two ways, i.e., inter channel power transfer and crosstalk, wherein inter channel power transfer dominates in most cases. It can be shown that an arbitrary signal channel in a DWDM system experiences a Raman amplification by all the shorter wavelength channels and so called Raman depletion by all the longer wavelength channels simultaneously. Hence, power transfer caused by SRS at channels with the shortest and longest wavelength is the most profound. On the other hand the net power transfer on the middle channel is almost zero. Owing to this particular situation, a channel add/drop at either end of a given wavelength band (cf. the dashed arrows in FIG. 1), e.g. the above-mentioned extended C-band C', leads to abrupt power changes of short duration on surviving channels due to SSI (signal-signal interaction). Furthermore, so called signal-pump interactions (SPI) lead to asymptotic power changes in surviving channels, such that combined SSI+SPI have a substantial influence on a Raman on/off gain of surviving channels, which should be maintained at a nominal value in order to keep an appropriate bit error ratio (BER) for the surviving channels. In the following description both the surviving channels in case of a channel drop and the previously existing channels in case of a channel add will be referred to as "surviving channels" for the sake of simplicity.

Figure 2A:
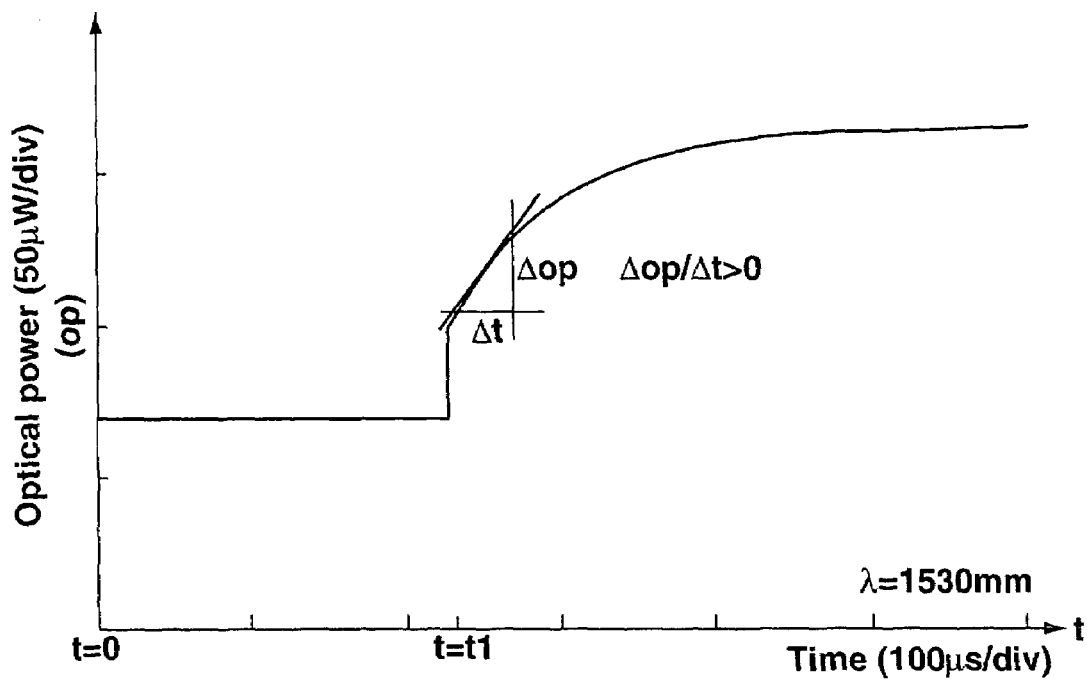
FIGS. 2a, b are diagrams showing a temporal evolution of the output power on a surviving channel in case of a plurality of channels being dropped at the input of the optical amplifier assembly in FIG. 1.

FIG. 2a shows a diagram of the optical power op measured in microwalts (μW) as a function of time t, measured in μs, as determined at the location of the detector circuit 7 of FIG. 1. For drawing said FIG. 2a, it has been assumed that a number of N−1 of the N input signal channels according to FIG. 1 are dropped at time t=0, e.g., due to a fibre break. Since said N channels are input into the optical transmission link 4 (FIG. 1) with essentially similar input optical power, the output pump powers of the individual pump light sources 5.1-5.3 comprised in Raman pump source 5 are tuned relative to each other to achieve an overall flat Raman gain for said N channels over the bandwidth, i.e. 1530 nm to 1570 nm, of the optical transmission link 4.

As already described in detail above, due to dropping a plurality of channels, the output optical power on the surviving channel will change due to a suppression or—in case there is more than one surviving channel—a reduction of signal-signal interactions (SSIs) and corresponding reduced Raman gain compression. In the diagram of FIG. 2a the wavelength of the surviving channel is located in the lower wavelength region of the optical bandwidth of the transmission link 4, i.e. close to λ=1530 nm for the extended C-band C'. In FIG. 2a, the channel output power first corresponds to a constant nominal output power, then increases abruptly with time and finally enters a so-called asymptotic transient. Thus, in order to maintain a nominal output power for the surviving channel, a reduction in Raman gain is required. The abrupt rise in output power at t=t1 coincides with a so-called fibre transit time, i.e. the time required by the disturbance due to channel dropping to travel through the section 4a of Raman active medium (FIG. 1). As stated before, at t=t1 there is an abrupt change in optical power due to power transfer from depleted higher wavelength channels to the surviving lower wavelength channel caused by SSI. After a short time of the order of a few nanoseconds, the system enters said asymptotic transient characterised by a positive slope (Δop/Δt>0) of the optical power with respect to time, i.e. the optical power on the surviving channel initially changes linearly with time, which corresponds to a constant valued first derivative of the optical power with respect to time t. This last effect is due to SPI.

Figure 2B:
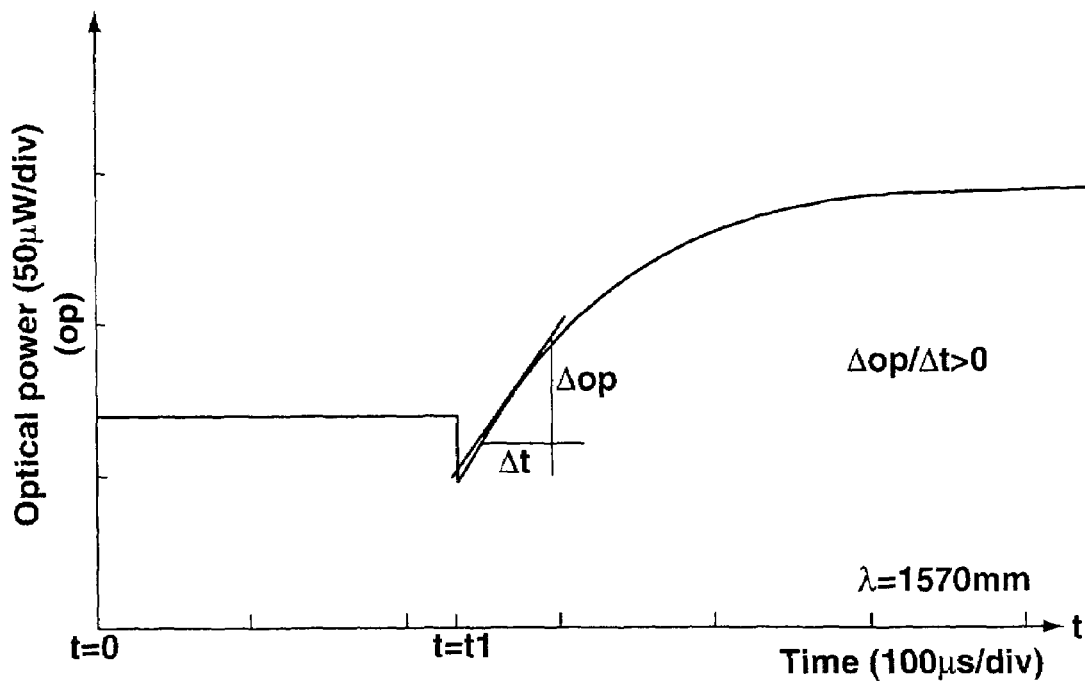

FIG. 2b shows a diagram which is essentially similar to that of FIG. 2a. However, for drawing FIG. 2b it has been assumed that the only surviving channel is located at the high bandwidth end of the optical bandwidth, i.e. close to λ=1570 nm for the extended C-band C'. Again, at t=0 a plurality of N−1 channels are dropped, e.g. due to a fibre break. After the said fibre transit time at t=t1 there is an abrupt drop in optical power on the surviving channel due to SSI because channel power is effectively transferred to lower wavelength channels. After a short time of the order of a few nanoseconds the system again enters said asymptotic transient due to SPI, such that despite of the short abrupt drop in optical power the surviving channel now presents a positive slope in optical power with respect to time t (Δop/Δt>0). Therefore, in analogy to the situation depicted in the above-described FIG. 2a, in case of a channel drop the detector circuit 7 (FIG. 1) will always measure a constant positive slope of optical power on the surviving channel with respect to time after said abrupt change in optical power has occurred. In accordance with the illustrations in FIGS. 2a, b said asymptotic transient with constant positive slope has a temporal duration of the order of microseconds.

It will be appreciated by a person skilled in the art, that in the cases of FIGS. 2a, b the same quantity, i.e. a positive slope, effectively indicates an increase of a channel optical power with respect to nominal output power before the fibre break. In contrast to this, the absolute value of the channel optical power takes on different values for times t>t1 such that a control method based on determining an absolute value of the optical channel power at t>t1 might effectively lead to an initial enhancement of the channel optical power in the case of FIG. 2b in order to compensate the presumed drop in optical channel power at t>t1. Such a misinterpretation of the actual power balance in the optical transmission link, i.e. the respective channels thereof, will create instabilities in the optical transmission system due to a cascade of a erroneous tuning during some period of time. Furthermore, these instabilities will delay the effective Raman gain control for a few tenths of microseconds, whereas in accordance with the present invention the slope of the channel output power versus time is used for to generate a Raman gain tuning control signal CS (FIG. 1), which leads to a fast and appropriate Raman gain variation in all cases.

As will further be appreciated by a person skilled in the art, an absolute value of the positive slopes is different in FIG. 2a and FIG. 2b, respectively, such that an absolute value of the respective slope could in principle be used to derive a quantitative measure as to how much a Raman gain should be reduced on that particular surviving channel.

Figure 3A:
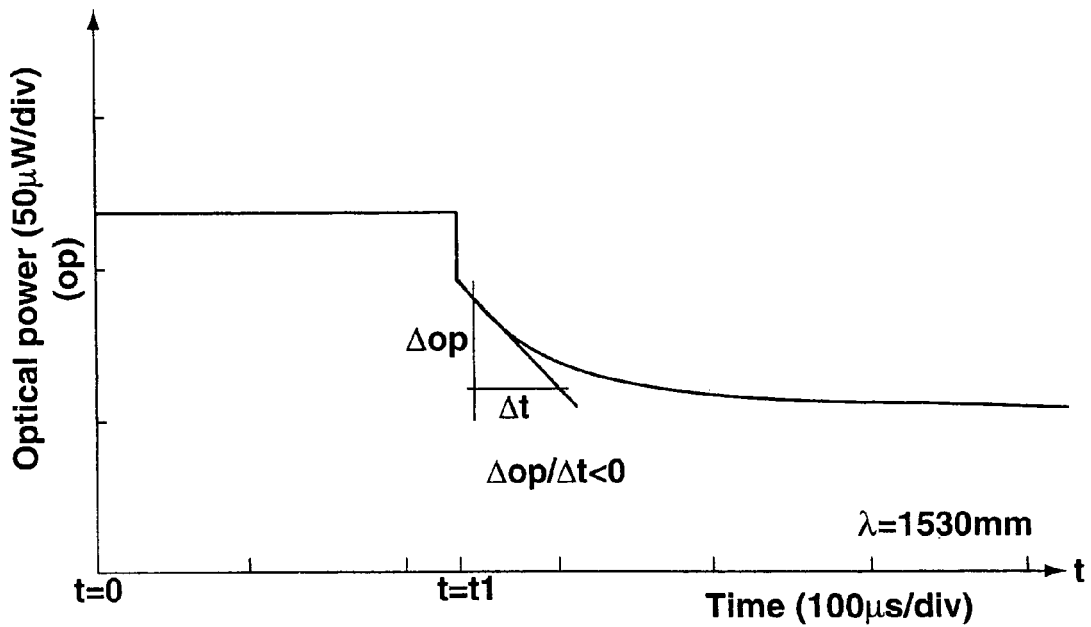
FIGS. 3a, b are diagrams showing a temporal evolution of the output power on an existing channel in case of a plurality of channels being added at the input of the optical amplifier assembly of FIG. 1.

Similar curves as in the above-described FIGS. 2a, b are obtained when N−1 channels are added to one existing channel: FIG. 3a illustrates the case in which said surviving channel exists in the lower part of the optical bandwidth used by the optical transmission system 1 (FIG. 1), i.e. λ=1530 nm. In this case, after the transit time t1 the output power of the already existing channel shows a decrease with time due to a depletion and a Raman gain saturation induced by the added channels. Again the abrupt change at t=t1 is due to SSI, whereas the asymptotic transient with initially constant negative slope (Δop/Δt<0) is due to SPI.

Figure 3B:
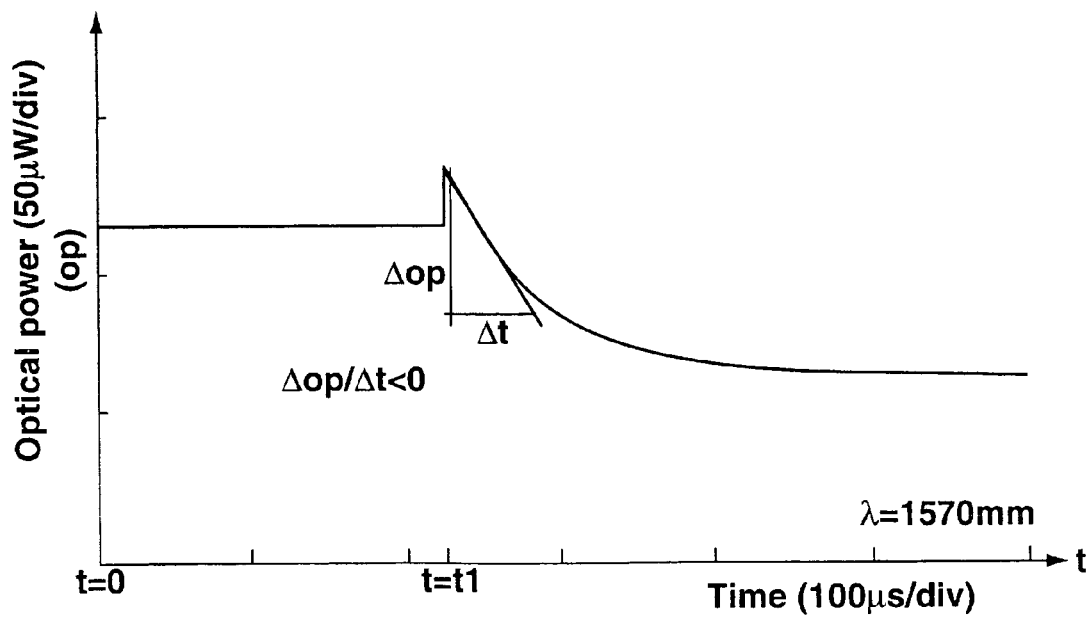

FIG. 3b illustrates the case in which the previously existing channel is located at the higher wavelength end of the optical bandwidth, i.e. λ=1570 nm. In this particular case the output power first increases steeply due to additional gain provided by signal-signal interaction and subsequently decreases due to Raman gain saturation induced by SPI. However, after the abrupt increase in optical power at t=t1 the diagram of FIG. 3b presents essentially the same constant negative slope (Δop/Δt<0) as in the diagram of FIG. 3a. In this way and in accordance with the present invention, a measured slope with respect to time of a quantity representative of the optical channel signal on the surviving channel can be used as a control signal CS (FIG. 1) for to tune the individual pump powers in the Raman pump source 5 (FIG. 1) to increase the Raman gain in order to reach said nominal output power for the previously existing channel. Again, as previously explained with reference to FIGS. 2a, b, referring only to an absolute value of the optical power for t>t1 may lead to presuming a rise in output power for t>t1 in the case depicted in FIG. 3b, which in turn might again lead to the above-described system instabilities.

Again, the difference in steepness of the negative slope between the situations depicted in FIGS. 3a and 3b, respectively, may be used to derive a quantitative measure of the required change in Raman gain initiated by the control signal CS.

Thus, by using the slope, i.e., the change with respect to time, of the optical power on the surviving channel in accordance with the present invention there is provided an efficient way to provide faster and more reliable Raman gain control.

The invention claimed is:

1. A method of adjusting Raman gain in an optical amplifier assembly, wherein a plurality of optical signals are input on different wavelength channels to a backward-pumped Raman active medium pumped by means of a Raman pump, wherein
a slope with respect to time of a quantity representative of a respective amplified optical signal on at least one existing/surviving channel is determined in case of channel add/drop, and in that the Raman pump source is tuned depending on said slope.

2. The method of claim 1, wherein a number of pump signals of the Raman pump source are adjusted to enhance an optical power on the existing/surviving channel, if said slope corresponds to a decrease in optical pump power on said channel with respect to time.

3. The method of claim 1, wherein a number of pump signals of the Raman pump source are adjusted to reduce an optical power on the existing/surviving channel, if said slope corresponds to an increase in optical pump power on said channel with respect to time.

4. The method of claim 1, wherein said slope is determined over a predetermined asymptotic transient time, in particular of the order of microseconds ($\mu s$).

5. The method of claim 1, wherein determining said slope involves determining a first derivative of said quantity with respect to time.

6. The method of claim 1, wherein said quantity is an optical power on the existing/surviving channel.

7. An optical amplifier assembly, comprising:
a Raman active medium adapted to propagate a plurality of wavelength multiplexed optical signals to be amplified on a plurality of channels, and
a Raman pump source adapted to deliver a number of counter-propagating pump signals to the Raman active medium,
whereby
a detector circuit arranged on the Raman active medium and adapted to determine a slope with respect to time in a quantity representative of a respective amplified optical signal on an existing/surviving channel in case of channel add/drop, wherein the Raman pump source is tuneable in dependence of said slope for to achieve an essentially constant optical power on said existing/surviving channel.

8. The optical amplifier assembly of claim 7, wherein the detector circuit is adapted to determine a slope of optical power on the existing/surviving channel.

9. The optical amplifier assembly of claim 7, wherein the Raman pump source is tuneable to enhance a Raman gain for the existing/surviving channel if said slope is negative.

10. The optical amplifier assembly of claim 7, wherein the Raman pump source is tuneable to reduce a Raman gain for the existing/surviving channel if said slope is positive.

11. The optical amplifier assembly of claim 7, wherein the detector circuit is adapted to determine said slope over a predetermined asymptotic transient time, in particular of the order of microseconds.

12. The optical amplifier assembly of claim 7, wherein the detector circuit is adapted to determine said slope by means of determining a first derivative of said quantity with respect to time (t).

13. A wavelength division multiplexing optical transmission system, comprising:
a transmitter adapted to transmit optical signals,
a receiver adapted to receive the optical signals, and
an optical transmission link connecting the transmitter and the receiver and adapted to propagate the optical signals, whereby
an optical amplifier assembly according to claim 7 comprised in the optical transmission link.

* * * * *